(12) United States Patent
Rittscher et al.

(10) Patent No.: US 8,712,139 B2
(45) Date of Patent: Apr. 29, 2014

(54) METHODS AND SYSTEMS FOR AUTOMATED SEGMENTATION OF DENSE CELL POPULATIONS

(75) Inventors: Jens Rittscher, Ballston Lake, NY (US); Rahul Bhotika, Albany, NY (US); Kishore Mosaliganti, Bangalore (IN); Dirk Ryan Padfield, Albany, NY (US); Raghu Machiraju, Bangalore (IN)

(73) Assignee: General Electric Company, Niskayuna, NY (US)

( * ) Notice: Subject to any disclaimer, the term of this patent is extended or adjusted under 35 U.S.C. 154(b) by 1069 days.

(21) Appl. No.: 12/053,295

(22) Filed: Mar. 21, 2008

(65) Prior Publication Data
US 2009/0238457 A1 Sep. 24, 2009

(51) Int. Cl.
*G06K 9/34* (2006.01)

(52) U.S. Cl.
USPC .............................. 382/133; 382/171; 382/173

(58) Field of Classification Search
USPC .......................................... 382/133, 171, 173
See application file for complete search history.

(56) References Cited

U.S. PATENT DOCUMENTS

| | | | | |
|---|---|---|---|---|
| 5,263,120 | A * | 11/1993 | Bickel | 706/62 |
| 5,790,692 | A | 8/1998 | Price et al. | |
| 6,157,733 | A * | 12/2000 | Swain | 382/154 |
| 6,219,440 | B1 | 4/2001 | Schaff et al. | |
| 6,221,596 | B1 | 4/2001 | Yemini et al. | |
| 6,332,034 | B1 | 12/2001 | Makram-Ebeid et al. | |
| 6,343,143 | B1 * | 1/2002 | Guillemaud et al. | 382/130 |
| 6,875,578 | B2 | 4/2005 | Giuliano et al. | |
| 7,215,467 | B2 | 5/2007 | Nakagawa | |
| 2002/0186874 | A1 | 12/2002 | Price et al. | |
| 2003/0184730 | A1 | 10/2003 | Price | |
| 2004/0029213 | A1 | 2/2004 | Callahan et al. | |
| 2005/0064534 | A1 * | 3/2005 | Gerdes et al. | 435/40.5 |
| 2006/0039593 | A1 | 2/2006 | Sammak et al. | |
| 2006/0098870 | A1 | 5/2006 | Tek et al. | |
| 2006/0127881 | A1 * | 6/2006 | Wong et al. | 435/4 |
| 2006/0204953 | A1 * | 9/2006 | Ptitsyn | 435/4 |
| 2006/0275847 | A1 | 12/2006 | Goodyer et al. | |
| 2007/0135999 | A1 * | 6/2007 | Kolatt | 702/19 |
| 2007/0250301 | A1 | 10/2007 | Valsberg et al. | |
| 2008/0131011 | A1 * | 6/2008 | Le Leannec et al. | 382/238 |

(Continued)

FOREIGN PATENT DOCUMENTS

| | | | |
|---|---|---|---|
| JP | 2002258163 A | 9/2002 | |
| JP | 2005525551 A | 8/2005 | |

(Continued)

OTHER PUBLICATIONS

C. Graffigne et al., "3-D aggregated object detection and labeling from multivariate confocal microscopy images: A model validation approach," I EEE Transactions on systems, vol. 33, No. 4, Aug. 1, 2003, ISSN: 1083-4419, pp. 572-581.*

(Continued)

*Primary Examiner* — David A Vanore
*Assistant Examiner* — Wyatt Stoffa
(74) *Attorney, Agent, or Firm* — Fletcher Yoder, P.C.

(57) ABSTRACT

Systems and methods for segmenting images comprising cells, wherein the images comprise a plurality of pixels; one or more three dimensional (3D) clusters of cells are identified in the images; and the 3D clusters of cells are automatically segmented into individual cells using one or more models.

24 Claims, 6 Drawing Sheets

(56) References Cited

U.S. PATENT DOCUMENTS

| | | | | |
|---|---|---|---|---|
| 2008/0304732 | A1* | 12/2008 | Rittscher et al. | 382/133 |
| 2008/0317324 | A1* | 12/2008 | Eblenkamp et al. | 382/133 |
| 2009/0081775 | A1* | 3/2009 | Hodneland et al. | 435/317.1 |
| 2011/0091081 | A1* | 4/2011 | Sarachan et al. | 382/128 |

FOREIGN PATENT DOCUMENTS

| | | | | |
|---|---|---|---|---|
| WO | WO03078965 | | 9/2003 | |
| WO | 2006125674 A | | 11/2006 | |
| WO | WO 2006125674 | * | 11/2006 | G01N 15/14 |
| WO | WO 2006125674 A1 | * | 11/2006 | |

OTHER PUBLICATIONS

C. Graffigne et al., "3-D aggregated object detection and labeling from multivariate confocal microscopy images: A model validation approach," IEEE Transactions on systems, vol. 33, No. 4, Aug. 1, 2003, ISSN: 1083-4419, pp. 572-581.*

PCT/EP2009/053244 Search Report and Written Opinion, Jul. 14, 2009.

Wahlby, C., "Algorithms for Applied Digital Image Cytometry", ACTA Universitatis Upsaliensis Uppsala, 2003, pp. 1-75.

Ancin et al., "Advances in Automated 3-D Image Analysis of Cell Populations Imaged by Confocal Microscopy", Cytometry 25:221-234 (1996).

Lindblad, J., "Development of Algorithms for Digital Image Cytometry", Uppsala University, Jan. 17, 2003, pp. 1-3.

Nielsen, F., "Neuroinformatics in Functional Neuroimaging", Aug. 30, 2002, Techical University of Denmark, pp. 1-10.

Chubb, C. et al., "Semantic Biological Image Management and Analysis", Proceedings of the 15th IEEE Int. Conf. on Tools with Artificial Intelligenc, 2003, pp. 1-8.

Adiga et al., "An efficient method based on watershed and rule-based merging for segmentation of 3-D histo-pathological images", Pattern Recognition, vol. No. 34, pp. 1449-1458, 2001.

Padfield et al., "Spatio-temporal cell cycle analysis using 3D level set segmentation of unstained nuclei in line scan confocal fluorescence images", pp. 1036-1039, Apr. 2006.

Laurendeau et al., "Shape-Based Contour Interpolation and Extrapolation Using Distance Mapping", Proceeding of the 18th International Conference on Pattern Recognition, pp. 659-662, 2006.

JP Office Action for Application No. 2011-500225 mailed Feb. 4, 2014 (translation included).

* cited by examiner

METHODS AND SYSTEMS FOR AUTOMATED SEGMENTATION OF DENSE CELL POPULATIONS

BACKGROUND

The invention relates generally to imaging and automatically analyzing densely packed cell populations of biological materials.

Model systems are routinely employed to mimic the actual living environment in which biochemical processes take place. For example, cell cultures provide a simple in vitro system for manipulating and regulating genes, altering biochemical pathways, and observing the resulting effects in isolation. Such cell cultures play an important role in basic research, drug discovery, and toxicology studies.

Dense cell populations, including, cancer cells, cell and tissue cultures and biological samples are analyzed to extract a wide variety of information from these biological materials, such as, testing pharmaceuticals, imaging agents and therapeutics prior to testing in larger animals and humans, and to examine the progression of cancer and other diseases. In the case of cell cultures, the cells are often grown in vitro in 3D assays that are commonly imaged using widefield or confocal microscopes. The research results have traditionally been analyzed by studying the resulting image stacks.

Although others have segmented cells in a 3D environment, these efforts typically use a set of standard steps for separating the cells from the background, breaking the groups of cells into individual cells, and measuring the attributes of the cells. These approaches work best for high-resolution data and require modifications to be scalable.

Such 3D analysis tools enable the quantitative measurement of cell features as well as the statistical distributions of cells, which can lead to new insights. They also enable fast and repeatable analysis. The more physiologically relevant a model system is, the greater is its predictive value. 3D cell models provide a physiologically relevant context that accounts for cell-to-cell and cell-to-matrix interactions. For studying tumor growth, 3D cell cluster assays model positional effects such as cellular gradients of nutrients and oxygen, effect of metabolic stress on tumor growth, and therapeutic responsiveness. In contrast, two-dimensional (2D) monolayer cell cultures are easier to analyze, but do not model certain effects such as the tumor micro milieu.

Three-dimensional cell clusters are commonly imaged using confocal microscopy. The resulting confocal image stacks, known as z-stacks, are then traditionally studied manually to measure and analyze the experimental outcomes. Automating the analysis of these image stacks will enable researchers to use such cultures in a high-throughput environment. To date, most studies are limited either to simple measurements such as the total volume of the cluster, or to 2D measurements that are based on a single confocal slice. Recent studies have shown, that while global statistics are important, there is a wealth of information in different spatial contexts within cell clusters.

BRIEF DESCRIPTION

The ability to identify individual cells is an important prerequisite for the automatic analysis of cell cultures and live cell assays. Image segmentation methods are commonly applied to address this problem. Segmenting populations of very densely packed cells is a particularly challenging problem. Prior knowledge about the particular staining protocol and underlying assumptions about the cell populations may be captured using the methods and systems of the invention that use one or more of the embodiments of a model-based framework.

Although the cell size and packing density are different among various cell populations, these differences do not readily translate into a precise model. For example, the 3D image of a zebrafish eye, shown in FIG. 1, comprises several different types of cells, however, even among cells of the same type, there are variations in size, shape, stain uptake and pixel intensity. One or more of the embodiments of the methods and systems disclosed employ modeling to segment such cell populations based, in part, on cell groups exhibiting heterogeneous sizes and packing densities.

These systems and methods solve many of the difficulties associated with measuring and analyzing cell morphology, channel markers, translocation of channel markers, and extracting statistics from a 3D volume in a 3D physical space. These systems and methods enable the segmentation of cells at multiple resolutions even in the presence of noisy data. They also enable use of multiple channels to segment cell clusters, individual cells and subcellular structures, including but not limited to the membranes, stroma and nuclei.

An embodiment of the systems and methods for segmenting images comprising cells, generally comprises: providing one or more images comprising a plurality of pixels; identifying one or more three dimensional (3D) cluster of cells in the images; and segmenting the 3D cluster of cells into one or more individual cells using one or more automated models. The cells may be individually segmented using one or more priors and/or one or more probabilistic models. The priors and probabilistic models may be based on a variety of cell characteristic based models such as but not limited to a shape based model or a correlation based model. The images may be analyzed, using one or more of the automated embodiments of the methods and systems, for a variety of biologically relevant measurements of the cells such, but not limited to, statistical distribution of cell centers across a dataset, morphometric measurements, and translocation of one or more biomarkers from one subcellular region to another subcellular region.

The step of providing one or more images may comprise providing a plurality of z-stack images, wherein the z-stack images may comprise widefield images, wherein the widefield images are used, at least in part, to segment one or more of the cell clusters into one or more cells. The z-stack images may also comprise confocal images, wherein the confocal images are used, at least in part, to segment one or more subcellular structures.

The method may also comprise the step of segmenting one or more nuclei of the cells using a watershed segmentation, wherein a nuclei center is used as a marker for the watershed segmentation.

A distance map saturation mechanism may be applied to the image to segment the clusters into individual cells using a shape-based model. Subcellular components such as the nuclei may be segmented at least in part using Watershed segmentation.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
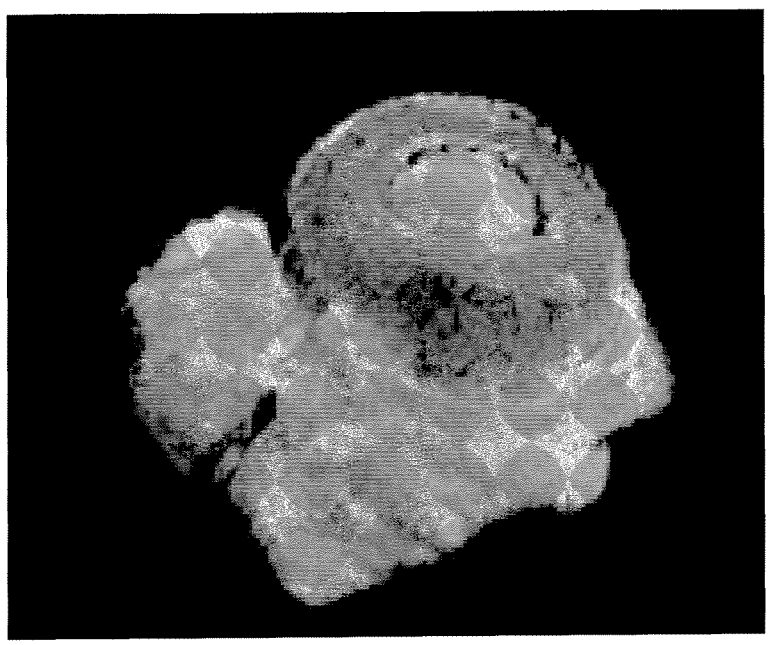
FIG. 1 shows an example image of a three-dimensional image that may be segmented using one or more of the embodiments of the methods and systems of the invention.

The system and methods have broad biological applications including but not limited to cell screening and pharmaceutical testing. One or more of the embodiments of the systems and methods automatically identify cell populations within one or more cell clusters and one more embodiments automatically segment each cluster into individual cells and subcellular structures using multi-channel image data. The system and methods further enable the automatic analysis of multidimensional, densely packed, cell populations. The information gathered from these images using the system and methods may be further used to take, and analyze, biologically relevant measurements of the cell populations and their cellular components. These measurements may include, but are not limited to, the statistical distribution of cell centers across the dataset, morphometric measurements, and the uptake and translocation of biomarkers from one or more subcellular regions to another subcellular region. These measurements can be made at the cellular level and at the cellular and/or subcellular level. The technical effect of the systems and methods is to enable 3D imaging and quantitative analysis of densely packed cell populations.

A common and traditionally difficult first step to such analysis involves image segmentation to separate regions of interest in the images from background. Image segmentation may take on many forms, but the result of this step is a set of isolated objects or cell clusters that can be measured or correlated with other regions. For example, nuclei of cells stained with a nuclear marker can be segmented, and these segmentation masks can then be correlated with other biological markers aimed at investigating various cell processes. One application, although the system and methods are certainly not limited to this application, is to measure the morphology of multi-celled organisms such as zebrafish or the translocation of biomarkers in densely packed cancer cell populations.

One or more of the algorithms used in various embodiments of the systems and methods may, for example, be used to identify organism morphology or the distribution of cells within a multi-dimensional cell population. For example, cell groups in an organism or in a population are identified and then the cells within each cell group is then segmented into individual cells using multi-channel image data. The system and methods further enable the automatic analysis of these cell populations. The information gathered from these images using the system and methods may be further used to take and analyze biologically relevant measurements of the organism morphology or cell populations. These measurements may include, but are not limited to, the statistical distribution of cell centers across the dataset, morphometric measurements, and the uptake and translocation of biomarkers.

To more clearly and concisely describe and point out the subject matter of the claimed invention, the following definitions are provided for specific terms that are used in the following description.

As used herein, the term "biological material" refers to material that is, or is obtained from, a biological source. Biological sources include, for example, materials derived from, but are not limited to, bodily fluids (e.g., blood, blood plasma, serum, or urine), organs, tissues, fractions, cells, cellular, subcellular and nuclear materials that are, or are isolated from, single-cell or multi-cell organisms, fungi, plants, and animals such as, but not limited to, insects and mammals including humans. Biological sources include, as further nonlimiting examples, materials used in monoclonal antibody production, GMP inoculum propagation, insect cell cultivation, gene therapy, perfusion, $E.\ coli$ propagation, protein expression, protein amplification, plant cell culture, pathogen propagation, cell therapy, bacterial production and adenovirus production.

A biological material may include any material regardless of its physical condition, such as, but not limited to, being frozen or stained or otherwise treated. In some embodiments, a biological material may include a tissue sample, a whole cell, a cell constituent, a cytospin, or a cell smear. In some embodiments, a biological material may include a tissue sample. In other embodiments, a biological material may be an in situ tissue target, if successive images of the targeted tissue can be obtained, first with the reference dye and subsequently with the additional dyes. A tissue sample may include a collection of similar cells obtained from a tissue of a biological subject that may have a similar function. In some embodiments, a tissue sample may include a collection of similar cells obtained from a tissue of a human. Suitable examples of human tissues include, but are not limited to, (1) epithelium; (2) the connective tissues, including blood vessels, bone and cartilage; (3) muscle tissue; and (4) nerve tissue. The source of the tissue sample may be solid tissue obtained from a fresh, frozen and/or preserved organ or tissue sample or biopsy or aspirate; blood or any blood constituents; bodily fluids such as cerebral spinal fluid, amniotic fluid, peritoneal fluid, or interstitial fluid; or cells from any time in gestation or development of the subject. In some embodiments, the tissue sample may include primary or cultured cells or cell lines.

In some embodiments, a biological material includes tissue sections from healthy or diseases tissue samples (e.g., tissue section from colon, breast tissue, prostate). A tissue section may include a single part or piece of a tissue sample, for example, a thin slice of tissue or cells cut from a tissue sample. In some embodiments, multiple sections of tissue samples may be taken and subjected to analysis, provided the methods disclosed herein may be used for analysis of the same section of the tissue sample with respect to at least two different targets (at morphological or molecular level). In some embodiments, the same section of tissue sample may be analyzed with respect to at least four different targets (at morphological or molecular level). In some embodiments, the same section of tissue sample may be analyzed with respect to greater than four different targets (at morphological or molecular level). In some embodiments, the same section of tissue sample may be analyzed at both morphological and molecular levels.

As used herein, the term biomarker or channel marker includes, but is not limited to, fluorescent imaging agents and fluorophores that are chemical compounds, which when excited by exposure to a particular wavelength of light, emit light at a different wavelength. Fluorophores may be described in terms of their emission profile, or "color." Green fluorophores (for example Cy3, FITC, and Oregon Green) may be characterized by their emission at wavelengths generally in the range of 515-540 nanometers. Red fluorophores (for example Texas Red, Cy5, and tetramethylrhodamine) may be characterized by their emission at wavelengths generally in the range of 590-690 nanometers. An examples of an orange fluorophore is a derivative of 1,5-bis{[2-(di-methylamino) ethyl]amino}-4, 8-dihydroxyanthracene-9,10-dione (CyTRAK Orange™) that stains both nucleus and cytoplasm, and examples of far-red fluorophores are 1,5-bis{[2-(di-methylamino) ethyl]amino}-4,8-dihydroxyanthracene-9,10-dione (DRAQ5™) a fluorescent DNA dye and 1,5-bis({[2-(dimethylamino) ethyl]amino}-4,8-dihydroxyanthracene-9,10-dione)-N-Oxide (APOPTRAK™) a cellular probe. Examples of fluorophores include, but are not limited to, 4-acetamido-4'-isothiocyanatostilbene-2,2'disulfonic acid, acridine, derivatives of acridine and acridine isothiocyanate, 5-(2'-aminoethyl)aminonaphthalene-1-sulfonic acid (EDANS), 4-amino-N-[3-vinylsulfonyl)phenyl]naphthalimide-3,5 disulfonate (Lucifer Yellow VS), N-(4-anilino-1-naphthyl)maleimide, anthranilamide, Brilliant Yellow, coumarin, coumarin derivatives, 7-amino-4-methylcoumarin (AMC, Coumarin 120), 7-amino-trifluoromethylcouluarin (Coumaran 151), cyanosine; 4',6-diaminidino-2-phenylindole (DAPI), 5',5"-dibromopyrogallol-sulfonephthalein (Bromopyrogallol Red), 7-diethylamino-3-(4'-isothiocyanatophenyl)4-methylcoumarin, -, 4,4'-diisothiocyanatodihydro-stilbene-2,2'-disulfonic acid, 4,4'-diisothiocyanatostilbene-2,2'-disulfonic acid, 5-[dimethylamino]naphthalene-1-sulfonyl chloride (DNS, dansyl chloride), eosin, derivatives of eosin such as eosin isothiocyanate, erythrosine, derivatives of erythrosine such as erythrosine B and erythrosin isothiocyanate; ethidium; fluorescein and derivatives such as 5-carboxyfluorescein (FAM), 5-(4,6-dichlorotriazin-2-yl) aminofluorescein (DTAF), 2'7'-dimethoxy-4'5'-dichloro-6-carboxyfluorescein (JOE), fluorescein, fluorescein isothiocyanate (FITC), QFITC (XRITC); fluorescamine derivative (fluorescent upon reaction with amines); IR144; IR1446; Malachite Green isothiocyanate; 4-methylumbelliferone; ortho cresolphthalein; nitrotyrosine; pararosaniline; Phenol Red, B-phycoerythrin; o-phthaldialdehyde derivative (fluorescent upon reaction with amines); pyrene and derivatives such as pyrene, pyrene butyrate and succinimidyl 1-pyrene butyrate; Reactive Red 4 (Cibacron .RTM. Brilliant Red 3B-A), rhodamine and derivatives such as 6-carboxy-X-rhodamine (ROX), 6-carboxyrhodamine (R6G), lissamine rhodamine B sulfonyl chloride, rhodamine (Rhod), rhodamine B, rhodamine 123, rhodamine X isothiocyanate, sulforhodamine B, sulforhodamine 101 and sulfonyl chloride derivative of sulforhodamine 101 (Texas Red); N,N,N',N'-tetramethyl-6-carboxyrhodamine (TAMRA); tetramethyl Rhodamine, tetramethyl rhodamine isothiocyanate (TRITC); riboflavin; rosolic acid and lathanide chelate derivatives, quantum dots, cyanines, pyrelium dyes, and squaraines.

For applications that use probes, as used herein, the term "probe" refers to an agent having a binder and a label, such as a signal generator or an enzyme. In some embodiments, the binder and the label (signal generator or the enzyme) are embodied in a single entity. The binder and the label may be attached directly (e.g., via a fluorescent molecule incorporated into the binder) or indirectly (e.g., through a linker, which may include a cleavage site) and applied to the biological sample in a single step. In alternative embodiments, the binder and the label are embodied in discrete entities (e.g., a primary antibody capable of binding a target and an enzyme or a signal generator-labeled secondary antibody capable of binding the primary antibody). When the binder and the label (signal generator or the enzyme) are separate entities they may be applied to a biological sample in a single step or multiple steps. As used herein, the term "fluorescent probe" refers to an agent having a binder coupled to a fluorescent signal generator.

For applications that require fixing a biological material on a solid support, as used herein, the term "solid support" refers to an article on which targets present in the biological sample may be immobilized and subsequently detected by the methods disclosed herein. Targets may be immobilized on the solid support by physical adsorption, by covalent bond formation, or by combinations thereof. A solid support may include a polymeric, a glass, or a metallic material. Examples of solid supports include a membrane, a microtiter plate, a bead, a filter, a test strip, a slide, a cover slip, and a test tube. In those embodiments, in which a biological material is adhered to a membrane, the membrane material may be selected from, but is not limited to, nylon, nitrocellulose, and polyvinylidene difluoride. In some embodiments, the solid support may comprise a plastic surface selected from polystyrene, polycarbonate, and polypropylene.

The methods and systems may be adapted for, but are not limited to, use in analytical, diagnostic, or prognostic applications such as analyte detection, histochemistry, immunohistochemistry, or immunofluorescence. In some embodiments, the methods and systems may be particularly applicable in histochemistry, immunostaining, immunohistochemistry, immunoassays, or immunofluorescence applications. In some embodiments, the methods and systems may be particularly applicable in immunoblotting techniques, for example, western blots or immunoassays such as enzyme-linked immunosorbent assays (ELISA).

One or more embodiments of the methods and systems use a probabilistic model that assumes that a given staining protocol will cause the cell centers to be uniformly bright. Depending on the emission frequency of the dye, all cell nuclei will appear to be uniformly bright. Since the cells in the samples are densely packed, the radiation of the fluorescent stain from neighboring cells generates a significant amount of structured background noise that cannot be eliminated by linear filtering. As such, the nuclei will not be well separated and their borders will not be well characterized. In addition, although it is possible to make certain assumptions about the shape of individual cells, it is necessary to account for the fact that cells are highly deformable. To integrate feature grouping and model estimation into one consistent framework, the segmentation methods described in U.S. patent application Ser. No. 10/942,056, entitled System and Method for Segmenting Crowded Environments Into Individual Objects, filed on Sep. 16, 2004, may be used.

Given a set of N observations $Z=\{z_i\}$, which may consist of any kind of image feature, e.g. corner points, edges, image regions, the algorithm partitions these using a likelihood function that is parametrized on shape and location of potential object hypotheses. Using a variant of the EM formulation, maximum likelihood estimates of both the model parameters and the grouping are obtained simultaneously. The resulting algorithm performs global optimization and generates accurate results even when decisions cannot be made using local context alone.

A geometric shape model is used to identify which subsets C of Z can be associated with a single object. In a pre-processing step, a set of K possible groups of features, also referred to as cliques, are identified. The set of all cliques is defined as $$\mathcal{C} := \{C_1, \ldots, C_K\} \quad (1)$$

An assignment vector $Y=\{y_i\}$ of length N with $y_i$ in $[1, \ldots, K]$ is used to associate each feature $z_i$ with a particular clique $C_k$. The association of features to cliques is directly coupled with questions regarding the assumed shape and appearance of objects. This is why cliques $C_k$ are associated with parameters $\theta_k$ that encode the location, shape, and appearance of cells. The collection of shape parameters is denoted as $$\Theta = [\theta_i, \ldots, \theta_K] \quad (2)$$

The methods model the joint probability of an assignment vector Y and a feature set Z, i.e. $p(Y, Z; \Theta)$. Here $\Theta$ denotes the parameters of the distribution. The reader should note that the range of the random variable Y, given by $\mathcal{Y}$, is defined by the set of cliques C. The assignment vector Y is treated as a hidden variable because the assignments of features $z_i$ to cliques $C_k$ cannot be observed directly. EM is used to find the maximum likelihood estimate of $\Theta$ and a distribution for Y that can be sampled to generate likely assignments.

The joint probability $p(Y, Z; \Theta)$ may be modeled by defining a merit function for a particular feature assignment Y, given a set of image features Z. For example, the affinity of a particular subset of image features $(z_i, \ldots, z_j)$ to a particular clique may be measured. In this example embodiment, the affinity of single feature assignments is modeled, as well as pair-wise assignments to a given clique $C_k$ with shape parameters $\theta_k$. The corresponding affinity functions are denoted as $$g(z_i, \theta_k) \text{ and } g(z_i, z_j, \theta_k)$$

The log likelihood of a feature assignment is formulated given a set of image features Z as $$L(Y \mid Z; \Theta) \propto \quad (3)$$

$$\gamma_1 \sum_{k=1}^{K} \sum_{i=1}^{N} g(z_i, \theta_k) \delta_{\mid C_k}(y_i) + \gamma_2 \sum_{k=1}^{K} \sum_{\substack{i,j=1 \\ i \neq j}}^{N} g(z_i, z_j, \theta_k) \delta_{\mid C_k}(y_i, y_j),$$

In this example, it is not necessary to compute the normalization constant that depends on Y because the set of cliques does not change. Since the value of $p(Z)$ remains constant throughout the formulation, then $$p(Y|Z; \Theta) = p(Y|Z; \Theta)p(Z) \propto \exp(L(Y|Z; \Theta)) \quad (4)$$

In embodiments in which it is desired to segment heterogeneous cell populations or identifying different cell populations, the methods cannot assume that all cells will be of similar shape. As such, the feature points, shape models, and the affinity functions are adapted to segment such heterogeneous cell populations. To account for the heterogeneity of a given specimen, some of the embodiments of the methods use structure labels. For example, a label, $\Lambda_k$, is assigned to certain regions of the volume that have a homogeneous structure. While cells in some areas might be small and densely packed, cells might be larger in others. The structure label $\Lambda$ is used to identify such regions. In this example, the distribution of the shape parameters depends on the structure label that has been assigned to a given region of the volume. The likelihood function, is modified accordingly:

$$L(Y \mid Z; \Theta, \Lambda) \propto \quad (5)$$

$$\gamma_1 \sum_{k=1}^{K} \sum_{i=1}^{N} g(z_i, \theta_k, \Lambda) \delta_{\mid C_k}(y_i) + \gamma_2 \sum_{k=1}^{K} \sum_{\substack{i,j=1 \\ i \neq j}}^{N} g(z_i, z_j, \theta_k, \Lambda) \delta_{\mid C_k}(y_i, y_j).$$

Both widefield and confocal z-stack modes may be used to acquire images used for the analysis. The widefield images are used to segment the cell clusters, and the confocal z-stack images are used to segment the individual cells or the cell nuclei. As a non-limiting example, the images may be taken using GE Healthcare's IN Cell Analyzer 1000 using a 20X, 0.45 NA objective. The Z-stack images may obtained using a widefield mode as well as the Optical Z-sectioning (OZ) Module, which utilizes structured light imaging to eliminate out of focus light from the resulting image. As the z-slice resolution degrades beyond the size of the individual target objects, a given assay may effectively reduce to a 2D image environment since each object may, in some instances, be present in only a single slice.

In this example of the systems and methods, processing is carried out in physical coordinates (e.g. μm) instead of pixels. Physical coordinates are used in this example so that the algorithms can be generalized and may include size and shape models. The advantages of both the widefield and confocal images are exploited for processing because widefield images distinguish the nuclear clusters and confocal images enhance the nuclei. The images are first preprocessed to separate the foreground from the background. In the preprocessing step the local image statistics are used to eliminate background pixels.

Due to the proximity of the nuclei in the cell clusters, the nuclear stain generally leaks out of the nuclei, resulting in a bright background around the cells. Further, signal attenuation by nuclei blocking the excitation light leads to dimmer nuclei inside the cell clusters. As such, local image characteristics are used in this example to segment the image to separate the background and foreground. A threshold function T, is computed, so that it specifies a threshold for every voxel x in the volume V. For any given voxel location $x \in V$ the value of $T(x)$ is based on the local image statistics in a neighborhood $\Omega(x)$ of the voxel. In this example, the size of this neighborhood is set according to the size of the average cell nucleus. Computing $T(x)$ for every voxel x is computationally intensive, so a 3D lattice L may be used instead. For every $x_i \in L$ the value of $T(x_i)$ is computed as, $$T(x_i) = \begin{cases} \tau_V & \text{if } \sigma_{\Omega(x_i)} < \sigma_B \\ \tau_{\Omega(x_i)} & \text{otherwise.} \end{cases} \quad (6)$$

Here $\tau_V$ denotes a global threshold calculated using the Otsu method on the entire volume V. The Otsu method finds the threshold, maximizing the between-class variance of the histogram of pixels. Similarly $\tau_{\Omega(x_i)}$ is the Otsu threshold computed in a local neighborhood. $\sigma_{\Omega(x_i)}$ denotes the variance of voxel intensities in a neighborhood $\Omega_{(x_i)}$, and $\sigma_B$ denotes the variance of voxel intensities for which $I(x) < \tau_V$. This variance provides a measure of how much the background is expected to change. For all remaining voxel locations $x \notin L$, the value of $T(x)$ is computed using linear interpolation. This method effectively determines whether a neighborhood contains a mix of background and foreground voxels using the variance of the neighborhood voxel intensities $\sigma_{\Omega(x_i)}$. If this variance is small relative to $\sigma_B$, the global value $\tau_V$ is used, which avoids noisy local calculations in homogeneous regions.

The size of the lattice may be adapted to the computational requirements. Note that there is a trade-off related to the overlap of the neighborhoods: if the overlap is too great, the accuracy will be high but processing time will be large; if the overlap is too small (for example, non-overlapping neighborhoods), the processing time will be much less, but the accuracy will suffer, especially at the borders of the neighborhoods.

Adaptive thresholding is not necessarily required, for example, when the background illumination is constant across the image.

The other detections in the nuclei can be removed by using a nuclear size constraint in a greedy manner as follows. Find the regional maxima in the image that are the largest in a given radius corresponding to the nucleus size. Then, all of the maxima are labeled (after masking the background ones to save time) and sorted by intensity. Then, starting from the brightest maximum, those maxima from the list that are within the distance measure from that maximum are removed. This step continues for progressively darker maxima until all of the maxima have been considered. Because the approximate cell radius is used for these computations, this example of the method is model driven. These methods may be optimized by first smoothing the image. Smoothing is not always necessary since the size constraint ensures that each nucleus is only detected once. However, it does assist the localization of the center by removing outliers. The centers of the nuclei obtained in this manner serve as seeds for the watershed algorithm. A distance map is generated from these seeds using a Danielsson distance algorithm. The nuclei boundaries are then defined using two constraints: a model-based sized constraint and the shape defined by the background mask. When the watershed algorithm is applied to the resulting distance map, the cells are effectively segmented.

The watershed segmentation algorithm is adapted to separate the cells that touch. Although the shapes are not smooth, which, in some instance, can be corrected through morphological operations, such operations are sometimes best left towards the end of the process. Instances in which such operations are better applied toward the end of the process is instances in which they are expected to fundamentally change the shapes derived from the data and when they are highly dependent on the size of the structuring element.

After the foreground is separated from the background, the distance map of the binary objects is then located and a watershed step may be applied to separate the clusters. However, because of over-segmentation resulting from multiple maxima in the distance map, a distance image may be processed before calculating the watershed. The distance map typically comprises many local maxima. When viewed as a topological map, the local maxima are preferably combined into one maximum for each region so it can be used to segment each nuclear cluster. Multiple local maxima exist because the binary object is typically elongated and the surface is irregular rather than precisely circular. If the target object were precisely circular, then there would be only one maximum. To combine these maxima into one maximum, a distance map saturation is applied. If the maxima differ by only a small height, they are combined, which saturates the distance map by truncating its peaks. This process may be performed using fast morphological operations. Although the saturation is applied in the intensity dimension, morphological operations in the spatial dimension typically give the same result since the distance map generally by definition changes linearly. As described, the distance map processing may be applied to the entire image at once and does not need to take into account each individual cluster; resulting in a faster process.

Example of Distance Map Saturation Steps:
1. Set h, which is the height difference to saturate.
2. Grayscale erode the input map by h.
3. Grayscale dilate the eroded map from Step 2 by h+1.
4. Take the minimum of the input map image and the dilated map from Step 3. This gives an image of the saturated maxima.

The grayscale erosion with a radius of h is essentially a min operator within a given distance. This typically truncates the peaks since, as in this example, a distance map is used. The grayscale dilation is preferred in this example to bring the borders of the distance map back to their original location. In this example, the dilation radius is 1 more than the erosion; otherwise, detail may be lost. Taking the minimum of the original image and the dilated image brings all values in the image back to their original values except for the peaks, which typically do not recover from the original erosion operation.

The distance map saturation in this example is similar to finding the extended extrema. However, in other examples, the step of locating the extended maxima may use image reconstruction, which can be quite slow, especially for large h-values. The dilation and erosion operations can become slow for large kernels, and large kernels may be necessary because the nuclear clusters are relatively large. To increase the speed of this step, a subsampling step is applied. The subsampling step may comprise: subsampling the distance map, processing, and then supersample the result.

Subsampling is an option, at least, when using a distance map, which generally by definition uses linear interpolation between points. This also can give erosion and dilation with sub-pixel accuracy for non-integral spacing by subsampling by the desired amount and doing morphology with a radius of 1. If the kernel is specified in mm and there are some fractional values, then the dilation always rounds because it needs integer radii. This may introduces error into the system. It may also require a prohibitively long time to calculate for large kernels, especially when doing grayscale erosion. Alternatively, the image may be resampled by the amount specified in mm for the radius, then eroded/dilated with a radius of 1, and then resampled back.

The areas of the processed distance map image corresponding to the background are then masked. The watershed step is then applied to the resulting image to segment the clusters. These steps, in part, enable rapid segmentation of the nuclear clusters in the mean image and also locate the (x,y) centers of each cluster as specified by global maxima for each cluster of the distance map.

The slice location of the center of each cluster is also preferably determined. Because the clusters are spherical in 3D, the slice corresponding to the widest part of the cluster, by definition, contains the center. For this step, a max index image is created, which is generally a 2D image in which each pixel corresponds to the slice containing the maximum value for that x,y location. When several slices have the same intensity for a particular x,y location, the mean of these slices is taken. The nuclear cluster mask is then used from the preceding step to isolate the foreground of this max index image and extract the contour of a given width of each cluster. A histogram may be created of the max indices around the border of the cluster from the segmentation mask. The slice index that occurs most frequently in this histogram thus corresponds with the widest part of the cluster and thus the cluster center. The mode of the histogram is identified to provide this value. Combining this z location of the cluster center with the x and y locations found earlier, the 3D location of each cluster is identified which may then be used to find the distribution of the cell nuclei from the cluster center.

Example of Nuclear Cluster Processing
1. Subsample the binary mask.
2. Open and close the binary mask to get rid of small protrusions using a fast binary algorithm.
3. Find the distance map.
4. Use the saturation algorithm.
5. Supersample the distance map after rescaling the values.
6. Find the regional maxima.
7. Find the watershed of the distance map masked by the thresholded background. This gives the x,y segmentation of the clusters.
8. for Each cluster do
9. Find the slice center of each cluster using the "max index image".
10. end for
11. Create a distance map from the center of the cluster.

Using several acquisitions at different slice resolutions of the same 3D assay, the robustness of the nuclear cluster processing, to different resolutions, may be determined. The cell counts at these various resolutions may be close. Generally, the lower the slice resolution, the closer effectively to 2D the image will be. This indicates how far the resolution may be degraded while still obtaining useful measurements. Distribution graphs may also be generated that provided measures of the hypoxicity of the clumps.

One or more of the embodiments of the methods and systems incorporating prior knowledge about the physical and structural properties of a given specimen, which are referred to as priors. Random heterogeneous materials may be used to define such structure labels Li using only limited measurements.

N-point probability functions are known to characterize random heterogeneous materials. For example, a measure based on n-point correlation functions may be used to identify clusters of cells. Given a region of space $\mathcal{V} \in R^d$, it can be assumed that the volume $\mathcal{V}$ is partitioned in two disjoint phases $\mathcal{V}_1$ and $\mathcal{V}_2$. An indicator function is being used to formulate to which set a given location $x \in \mathcal{V}$ belongs $$X^{(i)}(x)=1 \text{ if } x \in \mathcal{V}_i, 0 \text{ otherwise.} \tag{7}$$

The probability that n points at positions $x_1, x_2; \ldots ; x_n$ are found in phase $i=(i_1; i_2; \ldots ; i_n)$ $$S_n^{(i)}(x_1, \ldots, x_n) = P(X^{(i_1)}(x_1)=1, \ldots, x^{(i_n)}(x_n)=1). \tag{8}$$

Figure 2:
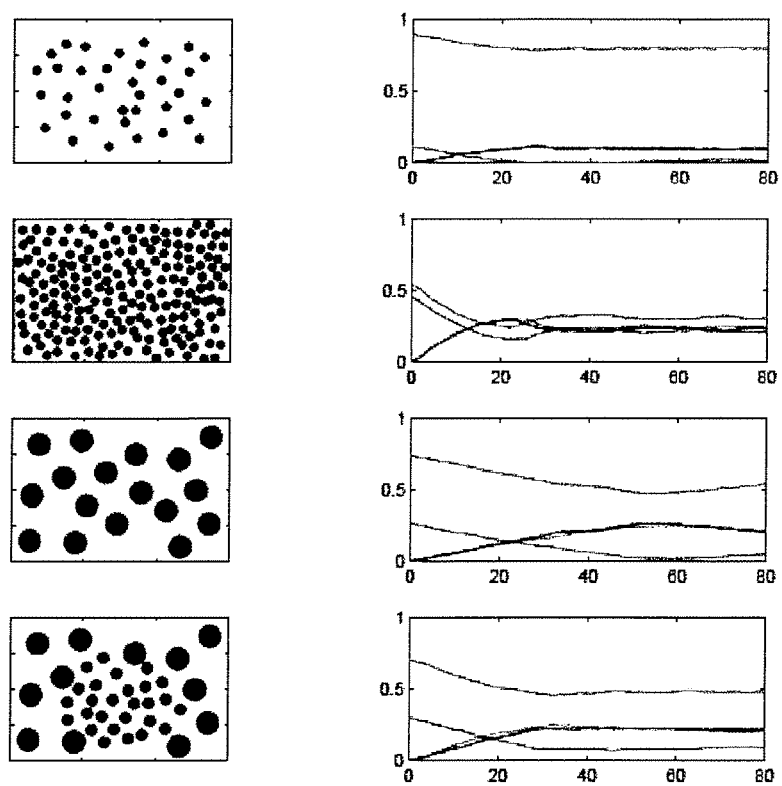
FIG. 2 shows four graphs illustrating the type of information two-point probability functions may be used to capture.

To formulate priors for the segmentation algorithm the following 2-point probability functions may be used:

$$P_0 0(r) = S_n^{(I)}(x_1, x_2) \text{ with } I=(1,1)$$

$$P_1 0(r) = S_n^{(I)}(x_1, x_2) \text{ with } I=(0,1)$$

$$P_0 1(r) = S_n^{(I)}(x_1, x_2) \text{ with } I=(1,0)$$

$$P_0 0(r) = S_n^{(I)}(x_1, x_2) \text{ with } I=(0,0), \tag{9}$$

where $|x_1-x_2|=r$. The graphs shown in FIG. 2 illustrate the type of information these two-point probability functions may be used to capture. The intersection of the P11 and P01 contains some information about the radius of the objects. Line A refers to P11, Line B refers to P01, Line C refers to P10, and Line D refers to P00.

Figure 3:
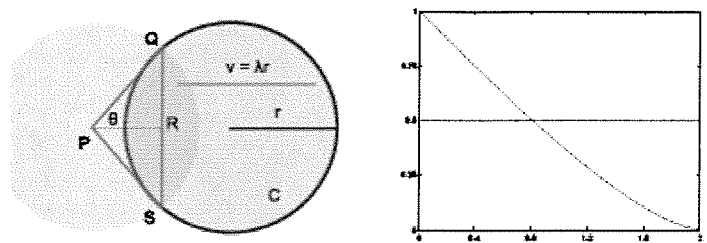
FIG. 3 shows how the radius of an object may be estimated based on a point at which the area ratio is 0.5.

Experimental data may be used to estimate an object's size. As shown in FIG. 3, the radius of an object may be estimated based on a point at which the area ratio is 0.5. From this an estimator for the side of the radius may be determined. In this example, the estimator is based on:

$$P_{11}(r) = P_{10}(r). \tag{10}$$

In this example embodiment, the probability that a line segment line segment $\overline{PQ}$ of length r is fully contained in the foreground is equal to the probability that such a line segment will intersect start in a foreground region and end in the background. Based on the assumption that the specimen mainly consists of round objects of similar size, as illustrated in FIG. 3, the condition (8) is used to formulate an estimator for the distribution of the size of the foreground objects. Assuming that line segments of length $\lambda r$, where $\lambda \in [0, 2r]$, that are parallel to line E in FIG. 3. A set of points are first calculated in the circle C that are potential starting points for line segments having length $\lambda r$ such that both endpoints of the line segment are within the circle, i.e.

$$\mathcal{S}_\lambda = \{x \in C | x+v \in C \text{ and } \|v\|_2 = \lambda R\}. \tag{11}$$

The size of the set $\mathcal{S}_\lambda$ can be computed directly. The notation illustrated in FIG. 3 is used in this example to compute $|\mathcal{S}_\lambda|$.

The sector, S, of the circle with radius r and center P that is defined by the points Q and S can be calculated as $$|S| = \pi r^2 \frac{\theta}{2\pi} \tag{12}$$

Observing that the line segment $\overline{PC}$ is of length $$|\overline{PR}| = r - \frac{2r - \lambda r}{2} = \frac{\lambda}{2} r \tag{13}$$

the angle q can be calculated as $$\theta = 2\arccos\left(\frac{|\overline{PR}|}{r}\right) = 2\arccos\left(\frac{\lambda}{2}\right). \tag{14}$$

Hence the area of the sector S is $$|S| = r^2 \arccos\left(\frac{\lambda}{2}\right). \tag{15}$$

In the next step, the area of the triangle, K, is calculated, defined by the points P, O, and S. Using the Pythagorean theorem $$|\overline{OS}| = \left(r^2 - \frac{\lambda^2}{4} r^2\right)^{\frac{1}{2}} = \frac{r}{2}(4 - \lambda^2)^{\frac{1}{2}} \tag{16}$$

The area of the triangle K can now be calculated as $$|K| = \frac{1}{2} |\overline{OS}| \frac{\lambda}{2} r = \frac{r^2}{8} (4\lambda^2 - \lambda^4)^{\frac{1}{2}}. \tag{17}$$

Finally, the size of the set $\mathcal{S}_\lambda$ can be calculated as $$|\mathcal{S}_\lambda| = 2(|S| - |K|). \tag{18}$$

Alternatively, the size of the set may be calculated as $$\mathcal{S}_\lambda^t = \{x \in C | x-v \in C \text{ and } \|v\|_2 = \lambda R\}. \tag{19}$$

To develop an estimator of the size of the radius r, one or more of the embodiments used the ratio $$\tau = \frac{|\mathcal{F}_\lambda| + |\mathcal{F}_\lambda^\eta|}{|C|}. \quad (20)$$

In instances where $\tau=0:5$, the condition (8) may be satisfied. However, this ratio does not depend on the actual size of the radius r. (FIG. 3)

Figure 4:
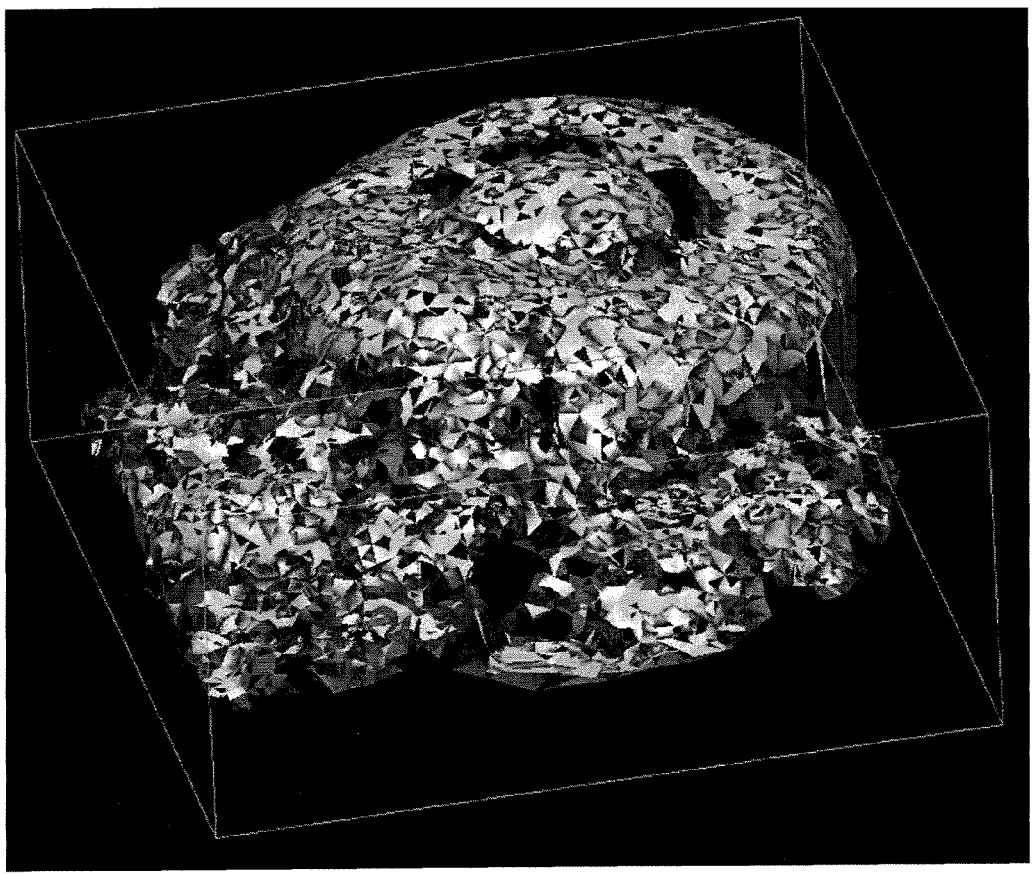
FIG. 4 shows the surface estimation for the zebrafish eye image shown in FIG. 1.
Figure 5:
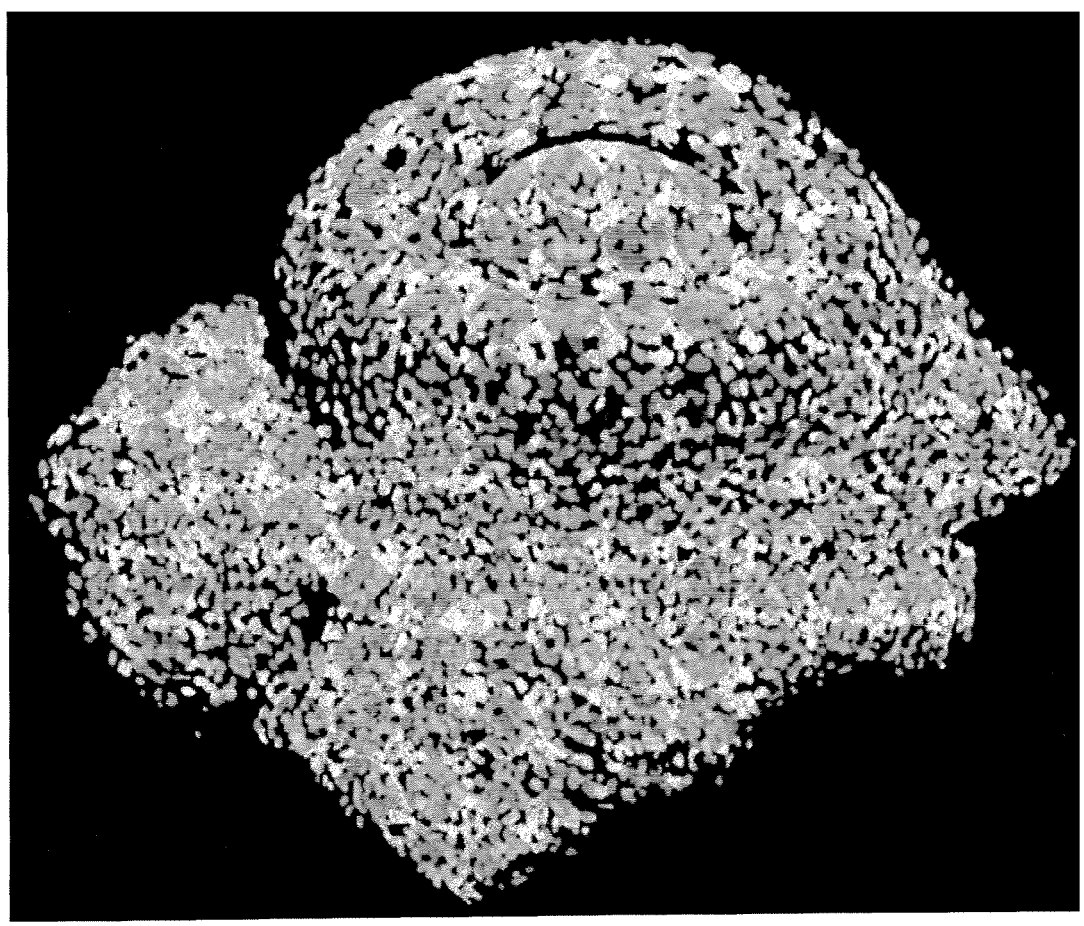
FIG. 5 shows a segmented image of the zebrafish eye shown in FIG. 1 after a level set refinement is applied.

In one or more of the embodiments, the packing density my need to be estimated. For example, the cell population may not fill an entire 3D volume. The nature of the specimen and staining artifacts can make the situation more complicated. For example, the stained nuclei of the zebrafish eye, shown in FIG. 1, lay on a manifold in space. It is therefore necessary to estimate this manifold before generating the line process, to avoid corrupting the material statistics. FIG. 4 is a surface estimation for the zebrafish eye shown in FIG. 1.

After the preprocessing and creation of the priors, one or more of the embodiments comprise an initialization step to estimate cellular structures such as the nuclei or cell centers. The initialization step may comprise one or more methods for estimating the cellular structures, such as but not limited to, methods based on one or more cell characteristics and methods that are correlation based.

Although various cell characteristics may be used to find a candidate set of cell centers, two non-limiting examples of cell characteristics that are useful in the methods and systems include cell shape and cell appearance. The correlation-based methods are more general and therefore are faster to run.

One example embodiment of the initialization step is a shape-based initialization. An attenuation dependent segmentation results in a set of foreground regions representing cells. The cell groups are then further divided into individual cells. This embodiment includes all domain information prior to calculating the watershed segmentation through the use of a marker-controlled watershed method. A marker is applied to all of the cell nuclei because the markers determine the number of connected components in the final partition of the image. In this example, the image that is passed to the watershed algorithm has high intensity values along the object boundaries. To segment the cell cluster into individual cells, shape and intensity information are combined to generate a marker image. The model constraints are imposed prior to performing the actual segmentation step. Since the shape of cells may be highly variable, it is generally best not to apply a strong shape prior. For example, the shape information may be encoded using a distance map. An example of the distance map $D(x)$ may be defined as, $$D(x) = \min_{y \in V^-} \|x - y\| \text{ with } V^- := \{y \in V \mid I(y) < T(y)\}, \quad (21)$$

where T(•) is defined in equation (4). The resulting distance map is zero for all background voxels. For all voxels that are part of the foreground, the distance map records the closest distance to a background voxel. So even if two touching cells are uniformly bright but there is a neck between them, the profile of the distance map D can be used to segment these into different nuclei. However, if there is no neck, other constraints are needed to separate them. We can also use an intensity model since stained nuclei have brighter centers that become more diffuse towards the edges. Since these functions have different scales they are first normalized before being combined. The normalization is achieved by rescaling 1 and D such that the foreground regions of both have zero mean and unit variance. The resulting combined function is computed as $$W(x)=\lambda 1(x)+(1-\lambda)D(x), \quad (22)$$

where $\lambda$ is typically set to 0:5 to give both intensity and shape information equal weight. Both the intensity and shape based functions place multiple markers in the cells.

The resulting combined map W comprises many regional maxima. The multiple regional maxima in the shape map are due to the elongation of the binary object and the roughness of its surface. If the object were perfectly circular, then there would be only one maximum. The intensity map has multiple maxima because of the high level of noise. When viewed as a topological map, using a saturation process, the regional maxima are combined into one maximum for each region.

To combine these maxima into one maximum, one or more of the embodiments use a method of opening by reconstruction with size n, defined as the reconstruction of f from the erosion of size n of f: $\gamma_R^{(n)}(f)=R_f^\delta[\epsilon^{(n)}(f)]$. The gray-scale erosion truncates the peaks. The reconstruction brings all values in the image back to their original values except for the peaks, which never recover from the original erosion operation.

The initialization step may also comprise a correlation-based method. The appearance of each individual cell will depend on the selected staining protocol and of course the characteristic of the imaging system. The noise and image characteristic of a specific microscope may be added as one or more factors to this method.

Based on the staining protocol, a template that models the appearance of a single cell nucleas is created. This template is used in this example to identify voxel positions that have a high likelihood of being cell centers. The voxel positions may be identified using a template matching method.

Depending on the instrument and the application problem the resolution for the data capture may differ. However, the resolution in any given slice (i.e. the x-y plane) typically remains constant while the sampling frequency along the z-axis typically changes. The template matching may be adapted to the given resolution without computing any additional interpolation of the original data set.

In instances in which the staining protocol results in an intensity distribution different from one or more of the examples, one can assume the normal distribution does not model the image intensities directly. Instead, it will model the occurrence of a certain images feature. This set of image features should be identified through a learning algorithm.

In one or more of the embodiments, it is assumed that the cell nuclei are uniformly stained and the intensity distribution of a single isolated nucleus has a Gaussian distribution in three dimensions. However, not all staining protocols will result in a uniform stain. In such instances, appearance models may be built from data. Data may be mapped into an appropriate feature space such that $$\mathcal{F}(1(x_i)) \propto \mathcal{N}(\mu_i, \Sigma), \quad (24)$$

holds. These maps may be used in the methods and systems to determine the location and morphology of individual cells from a clustered cell population. Based on a particular staining protocol, an appearance model may be designed that comprises features relevant and salient to the specific protocol. The process of recovering the individual cells in a dense population then generalizes as follows:
1) Map appearance to features: given the staining protocol, select a set or combination of features that localize individual cells. In the case of the nuclei staining, this would be the intensity values at the pixel themselves, while membrane staining could require finding boundaries or edges. The mapping from protocol to features and the set of features can be pre-determined from knowledge of the experimental protocol or learned from example data. Features are then automatically selected for each protocol based on the ability to observe or measure them in the image and in the feature's ability to localize the cell position in the volume.

2) Model noise and uncertainty: each selected feature would indicate cell location with confusion resulting from overlap with neighboring cells, variability in staining and acquisition, and finally, noise. To account for variability and noise, likelihood models are develop as described in Equation. 24, where instead of Gaussians, other distributions may be used as long as they are computationally tractable.

3) Segment individual cells: once the feature distributions (or likelihoods) that model the appearance of individual cells are available, the joint appearance of the cell cluster as a whole is modeled, where each feature may be observed due to the interaction between neighboring cells. In the example using a nuclei stain, this was modeled as a mixture of Gaussians over pixel intensities. The method is also applicable to a generalized feature set.

Figure 6:
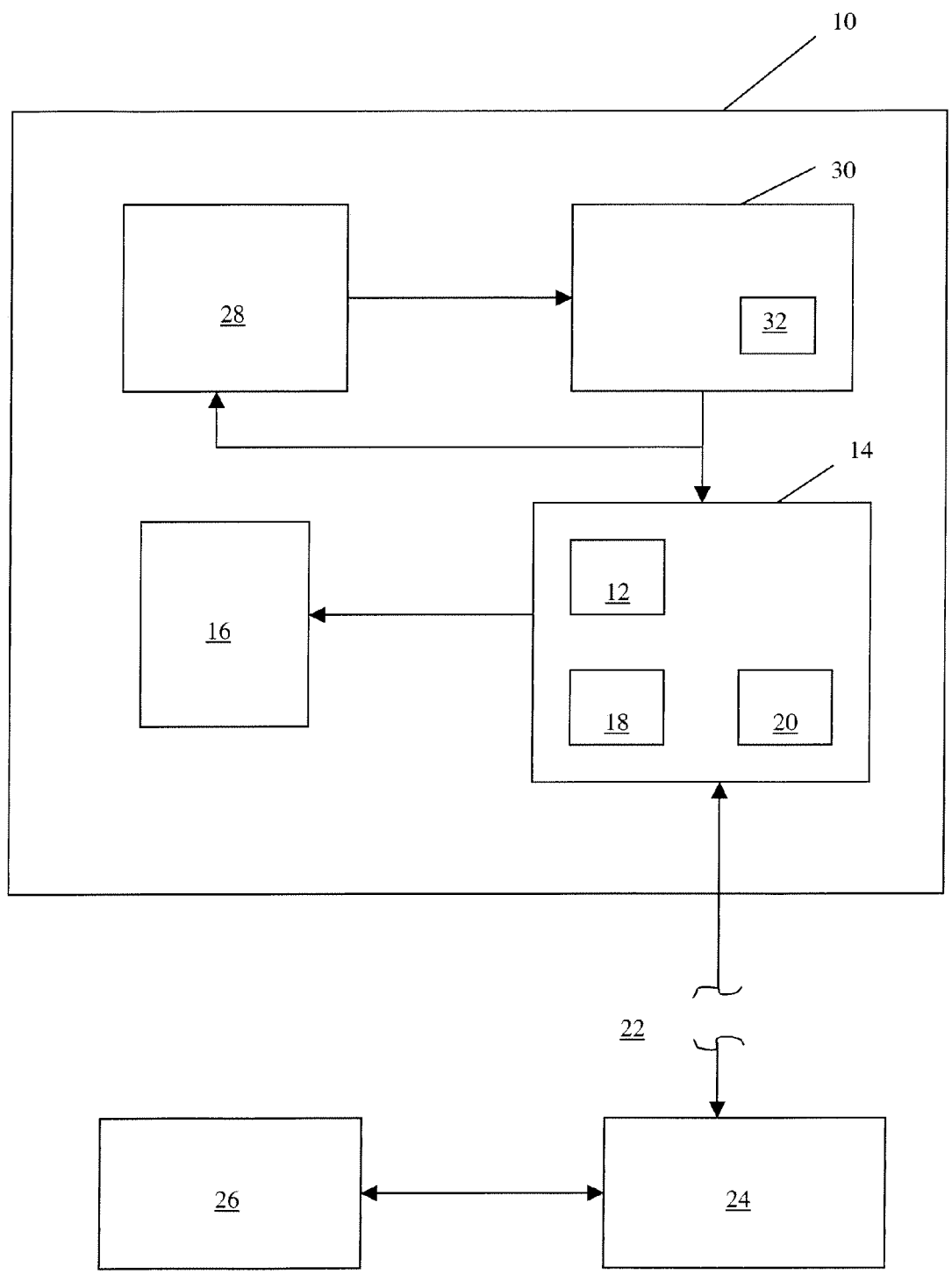
FIG. 6 is an embodiment of a system that incorporates one or more of the methods of the inventions.

The automated system 10 (FIG. 6) for carrying out the methods generally comprises: a means 12 for at least temporarily storing the digital images stained with the markers; and a processor 14 for carrying out one or more of the steps of the methods. The means for storing may comprise any suitable hard drive memory associated with the processor such as the ROM (read only memory), RAM (random access memory) or DRAM (dynamic random access memory) of a CPU (central processing unit), or any suitable disk drive memory device such as a DVD or CD, or a zip drive or memory card. The means for storing may be remotely located from the processor or the means for displaying the images, and yet still be accessed through any suitable connection device or communications network including but not limited to local area networks, cable networks, satellite networks, and the Internet, regardless whether hard wired or wireless. The processor or CPU may comprise a microprocessor, microcontroller and a digital signal processor (DSP).

The means for storing 12 and the processor 14 may be incorporated as components of an analytical device such as an automated high-speed system that images and analyzes in one system. Examples of such systems include, but are not limited to, General Electric's InCell analyzing systems (General Electric Healthcare Bio-Sciences Group, Piscataway, N.J.). As noted, system 10 may further comprise a means for displaying 16 one or more of the images; an interactive viewer 18; a virtual microscope 20; and/or a means for transmitting 22 one or more of the images or any related data or analytical information over a communications network 24 to one or more remote locations 26.

The means for displaying 16 may comprise any suitable device capable of displaying a digital image such as, but not limited to, devices that incorporate an LCD or CRT. The means for transmitting 22 may comprise any suitable means for transmitting digital information over a communications network including but not limited to hardwired or wireless digital communications systems. As in the IN Cell Analyzer 3000, the system may further comprise an automated device 28 for applying one or more of the stains and a digital imaging device 30 such as, but not limited to, a fluorescent imaging microscope comprising an excitation source 32 and capable of capturing digital images of the TMAs. Such imaging devices are preferably capable of auto focusing and then maintaining and tracking the focus feature as needed throughout the method.

The embodiments of the methods and systems may be used in a variety of applications such as, but not limited to, cell differentiation, cell growth, cell movement and tracking, and cell cycle analysis. Cell differentiation includes, but is not limited to, identification of subpopulations of cells within cell clusters. Such information is useful in many different types of cellular assays, such as but not limited to, co-culture assays in which two or more different kinds of cells are grown together.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for segmenting images of cells to measure morphology or distribution of the cells within a multi-layered, multi-dimensional cell population, comprising the steps of:
   providing one or more images comprising a plurality of pixels;
   identifying one or more three dimensional (3D) clusters of cells in the images, wherein each 3D cluster of cells comprises multiple layers of cells;
   finding a z-component of a cluster center for one or more of the 3D clusters of cells which comprises:
      creating a max index image, wherein each pixel corresponds to an image slice containing a maximum value at an x, y location;
      generating a histogram of one or more max indices around a border of one or more of the clusters derived from a mask generated in a step of segmenting the cluster; and
      locating a mode of the histogram and identifying one or more centers of one or more of the clusters based on the mode; and
   automatically segmenting one or more of the 3D clusters of cells into one or more individual cells using one or more models.

2. The method of claim 1, wherein the step of segmenting one or more of the clusters of cells into one or more individual cells uses one or more priors corresponding to one or more cell characteristics.

3. The method of claim 2, wherein the step of segmenting the clusters of cells into individual cells comprises initializing one or more probabilistic models.

4. The method of claim 3, wherein at least one of the probabilistic models comprises a shape-based model.

5. The method of claim 4, wherein the shape-based model comprises a distance map.

6. The method of claim 5, further comprising the steps of:
   applying a distance map saturation mechanism to said one or more images; and
   segmenting one or more nuclei of said cells using a watershed segmentation.

7. The method of claim 6, further comprising the steps of:
   subsampling the distance map;
   processing the subsampled distance map; and
   supersampling said processed distanced map.

8. The method of claim 3, wherein at least one of the probabilistic models comprises a correlation based model.

9. The method of claim 3, wherein one or more of the priors is based on an n-point correlation probability model.

10. The method of claim 1, further comprising the step of analyzing one or more biologically relevant measurements of the cells, wherein one or more of said measurements is of a translocation of one or more biomarkers from one subcellular region to another subcellular region.

11. The method of claim 1, wherein said step of providing one or more images comprises providing a plurality of z-stack images.

12. The method of claim 11, wherein said at least one of said z-stack images comprises widefield images.

13. The method of claim 11, wherein at least one of said z-stack images comprises confocal images.

14. The method of claim 13, wherein said confocal images are used, at least in part, to segment one or more subcellular components of said cells.

15. The method of claim 14, wherein one or more of the subcellular components of the cells is a nucleus.

16. The method of claim 15, further comprising the step of segmenting one or more nuclei of said cells using a watershed segmentation, wherein a nuclei center is used as a marker for said watershed segmentation.

17. The method of claim 1, wherein the step of segmenting one or more of the clusters of cells into one or more individual cells comprises determining one or more cell characteristics by estimating the parameters of a probabilistic model using a statistical learning algorithm.

18. The method of claim 1, wherein each 3D cluster of cells comprises a spherical shape.

19. A system for segmenting images of cells to measure morphology or distribution of the cells within a multi-layered, multi-dimensional human cell population, comprising:
   a storage device for at least temporarily storing one or more z-stack images each comprising a plurality of pixels; and
   a processor configured to:
      identify one or more three dimensional (3D) clusters of cells in said images, each 3D cluster of cells being multi-layered;
      find a z-component of a cluster center for one or more of the 3D clusters of cells by:
         creating a max index image, wherein each pixel corresponds to an image slice containing a maximum value at an x,y location;
         generating a histogram of one or more max indices around a border of one or more of said clusters derived from a mask generated in a step of segmenting the cluster; and
         locating a mode of said histogram and identifying one or more centers of one or more of said clusters based on the mode; and
      segment said 3D clusters of cells into individual cells using one or more automated models.

20. The system of claim 19, wherein the processor is configured to segment one or more of the clusters of cells into one or more individual cells using one or more priors corresponding to one or more cell characteristics.

21. The system of claim 19, wherein the processor is configured to segment the clusters of cells into individual cells at least in part by initializing one or more shape-based models.

22. The system of claim 19, wherein the processor is configured to segment the clusters of cells into individual cells at least in part by initializing one or more correlation based models.

23. The system of claim 19, wherein each 3D cluster of cells comprises a spherical shape.

24. A method for segmenting images of cells to measure morphology or distribution of the cells within a multi-layered, multi-dimensional cell population, comprising the steps of:
   providing one or more images comprising a plurality of pixels;
   identifying one or more three dimensional (3D) clusters of cells in the images, wherein each 3D cluster of cells comprises multiple layers of cells; and
   automatically segmenting one or more of the 3D clusters of cells into one or more individual cells using one or more models, wherein the step of segmenting one or more of the cluster of cells into one or more individual cells comprises:
   using one or more priors corresponding to one or more cell characteristics;
   initializing one or more probabilistic models, wherein at least one of the probabilistic models comprises a shape-based model comprising a distance map;
   applying a distance map saturation mechanism to said one or more images;
   segmenting one or more nuclei of said cells using a watershed segmentation
   subsampling the distance map;
   processing the subsampled distance map; and
   supersampling said processed distance map.

* * * * *